(12) United States Patent
Tao et al.

(10) Patent No.: US 10,695,250 B2
(45) Date of Patent: Jun. 30, 2020

(54) MEDICAL SUPPLY UNIT HAVING AN ELBOW JOINT PART

(71) Applicant: MAQUET (SUZHOU) CO., LTD., Suzhou (CN)

(72) Inventors: Xiaowang Tao, Suzhou (CN); Wei Peng, Suzhou (CN); Chunxia Xu, Suzhou (CN); Jiasheng Huang, Suzhou (CN); Qunhua Li, Suzhou (CN); Ming Ji, Suzhou (CN)

(73) Assignee: MAQUET (SUZHOU) CO., LTD., Suzhou (CN)

( * ) Notice: Subject to any disclaimer, the term of this patent is extended or adjusted under 35 U.S.C. 154(b) by 53 days.

(21) Appl. No.: 15/274,325

(22) Filed: Sep. 23, 2016

(65) Prior Publication Data
US 2017/0014291 A1    Jan. 19, 2017

Related U.S. Application Data

(63) Continuation-in-part of application No. 14/349,197, filed as application No. PCT/CN2013/000867 on Jul. 19, 2013, now abandoned.

(30) Foreign Application Priority Data

Jul. 24, 2012    (CN) .......................... 2012 1 0256410
Jul. 24, 2012    (CN) .......................... 2012 1 0256536
(Continued)

(51) Int. Cl.
*A61G 12/00*    (2006.01)
*F16M 11/20*    (2006.01)
(Continued)

(52) U.S. Cl.
CPC ....... *A61G 12/004* (2013.01); *F16M 11/2014* (2013.01); *F16M 11/38* (2013.01);
(Continued)

(58) Field of Classification Search
CPC .. A61G 12/004; A61G 12/002; A61G 13/107; F16M 11/12; F16M 11/10;
(Continued)

(56) References Cited

U.S. PATENT DOCUMENTS 2,837,307 A  *  6/1958  Schwager  ............ A61B 6/4464
                                                          248/325
3,916,967 A  *  11/1975  Carlisle  .................. A47C 31/10
                                                          150/154
(Continued)

*Primary Examiner* — Ingrid M Weinhold
(74) *Attorney, Agent, or Firm* — Christopher & Weisberg, P.A.

(57) ABSTRACT

A medical supply unit is disclosed. The medical supply unit has a mobile housing, a manual control mechanism for controlling location-movement or location-locking of the mobile housing, and a horizontal arm. The medical supply unit also has a vertical arm, an elbow joint part that connects the horizontal arm and the vertical arm, and a rotary shaft for movable connection of the vertical arm, in which the rotary shaft movably connects to one end of the elbow joint part via the vertical arm, wherein another end of the elbow joint part connects to the mobile housing via the horizontal arm, and a first end of the mobile housing is attached to the manual control mechanism. The mobile housing can provide electrical and gas supply connections for convenient use during medical procedures.

11 Claims, 18 Drawing Sheets

(30) Foreign Application Priority Data

| Jul. 24, 2012 | (CN) | .......................... 2012 1 0256715 |
| Jul. 24, 2012 | (CN) | .......................... 2012 1 0257057 |
| Jul. 24, 2012 | (CN) | .......................... 2012 1 0257080 |
| Jul. 30, 2012 | (CN) | .......................... 2012 1 0266741 |
| Aug. 14, 2012 | (CN) | .......................... 2012 1 0287195 |

(51) Int. Cl.
  *F16M 11/38* (2006.01)
  *F16M 13/02* (2006.01)

(52) U.S. Cl.
  CPC ..... *F16M 13/027* (2013.01); *F16M 2200/065* (2013.01); *F16M 2200/066* (2013.01); *F16M 2200/068* (2013.01)

(58) Field of Classification Search
  CPC ......... F16M 11/2014; F16M 2200/041; F16M 2200/066; F16M 2200/068; F16M 11/38; F16M 13/027; F16M 2200/065; F16M 11/2092; Y10T 403/257; Y10T 403/259; Y10T 403/32262; Y10T 403/24; Y10T 16/5383; F16C 11/10; A61B 2090/508; F16L 3/107
  USPC ....... 248/281.11, 282.1, 284.1, 274.1, 276.1, 248/278.1, 317, 343, 323, 324, 327
  See application file for complete search history.

(56) References Cited

U.S. PATENT DOCUMENTS

| 3,945,597 | A | * | 3/1976 | Klein .................... | F16M 11/10 248/327 |
| 3,981,340 | A | * | 9/1976 | Anderson .............. | A47C 31/10 150/154 |
| 4,266,747 | A | * | 5/1981 | Souder, Jr. ............. | F16M 11/14 248/123.11 |
| 4,523,732 | A | * | 6/1985 | Biber .................... | F16M 11/046 248/123.11 |
| 4,852,842 | A | * | 8/1989 | O'Neill .............. | F16M 11/2092 248/123.11 |
| 5,108,063 | A | * | 4/1992 | Koerber, Sr. .......... | F16M 11/10 248/284.1 |
| 5,618,090 | A | * | 4/1997 | Montague ............ | A61G 12/002 211/26 |
| 6,196,649 | B1 | * | 3/2001 | Block .................. | A61G 13/107 312/205 |
| 6,364,268 | B1 | * | 4/2002 | Metelski ............... | F16M 11/18 248/278.1 |
| 6,659,415 | B2 | * | 12/2003 | Kummerfeld .......... | F16M 11/10 248/327 |
| 7,464,909 | B2 | * | 12/2008 | Li .......................... | F16M 11/08 248/274.1 |
| 7,597,298 | B2 | * | 10/2009 | Papendieck .......... | A61G 13/107 248/281.11 |
| 7,597,299 | B2 | * | 10/2009 | Papendieck ............. | F16G 11/12 248/281.11 |
| 7,770,247 | B2 | * | 8/2010 | Lubbers ................ | F16D 63/008 188/171 |
| 7,770,860 | B1 | * | 8/2010 | Culpepper ........... | A61G 12/002 248/324 |
| 7,921,489 | B2 | * | 4/2011 | Newkirk ............. | A61M 5/1415 137/355.16 |
| 8,141,188 | B2 | * | 3/2012 | Lubbers ................ | F16D 63/008 188/171 |
| 9,702,397 | B2 | * | 7/2017 | Chen ..................... | F16C 11/045 |
| 2002/0074472 | A1 | * | 6/2002 | Gaida .................... | F16M 11/10 248/276.1 |
| 2003/0076015 | A1 | * | 4/2003 | Ehrenreich ............ | A61B 50/10 312/209 |
| 2007/0126318 | A1 | * | 6/2007 | Hamberg .............. | A61G 12/002 312/209 |
| 2007/0228230 | A1 | * | 10/2007 | Papendieck ........ | F16M 11/2014 248/126 |
| 2007/0251014 | A1 | * | 11/2007 | Newkirk .............. | A61M 5/1415 5/658 |
| 2008/0111039 | A1 | * | 5/2008 | Papendieck ............. | F16G 11/12 248/281.11 |
| 2009/0026901 | A1 | * | 1/2009 | Nies, III .............. | A61G 12/004 312/249.11 |
| 2012/0216345 | A1 | * | 8/2012 | Hand .................... | A61G 7/103 5/85.1 |
| 2015/0300563 | A1 | * | 10/2015 | Huang .................. | B65D 19/06 206/386 |

* cited by examiner

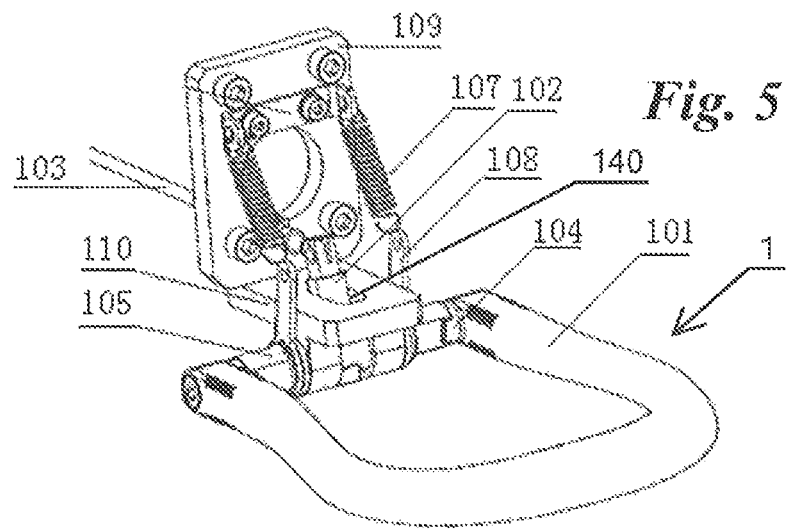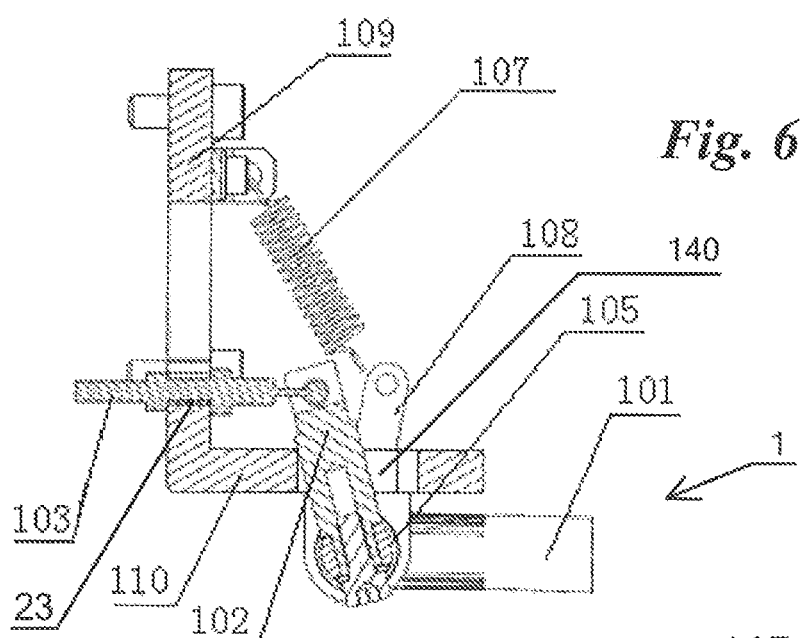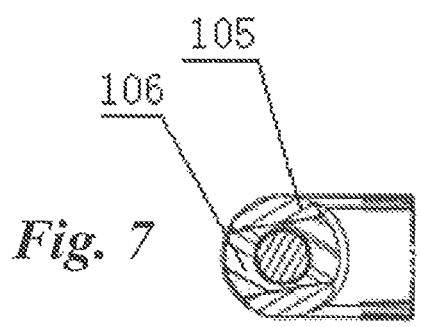

MEDICAL SUPPLY UNIT HAVING AN ELBOW JOINT PART

CROSS-REFERENCE TO RELATED APPLICATION

The present application is a continuation-in-part filed under 35 U.S.C. 111(a), and claims the 5 benefit under 35 U.S.C. 365(c) of PCT International Application No. PCT/EP2016/067489, filed Jul. 22, 2016, which designates the United States of America, and claims the benefit of German Patent Application No. 10 2015 009 990.6, filed Jul. 31, 2015. The disclosure of each of these applications is incorporated by reference herein in its entirety.

BACKGROUND OF THE INVENTION

1. Field of the Invention

The present invention relates to freely stopping medical supply units.

2. Description of the Related Art

Medical supply units have been widely applied and can be spotted at a variety of medical sites, especially in the operating theatres and ICUs. The medical supply units are essential to modern operating theatres of the hospital and mainly function as oxygen supply, suction, compression of air, nitrogen and other medical gas in operating theatres and the terminal adapter of the strong electricity and the weak electricity. However, the current medical supply units have the problems including the medical supply units cannot give a reliable positioning when stops in the course of operating, the medical supply units are difficult to pack for transportation, the inside space of the medical supply units is narrow which causes troubles in laying or even obstruct the laying of the gas pipes and electric protection pipes, and the medical supply units during the use have the dust-free, cleaning and hygiene issues.

During the use of the medical supply units, the location of the mobile housing is demanded to realize the free stopping at random locations or fixed location for convenience purpose. Currently, in the structure design of the medical supply units, although the medical supply units can rotate or move up and down conveniently, but the mobile housing of the medical supply units cannot realize the free stopping at random locations or fixed location, which is quite inconvenient during the use of the medical supply units. In addition, during the use of the medical supply units, since the mobile housing of the medical supply units is manufactured by mechanically metal welding, the number of the screws exposed on the mobile housing is a lot and the dusts are accumulated on the exposed screws, which is not easy to clean and is an adverse impact on the equipment and environmental hygiene, and thus fails to meet the thoroughly dust-free requirement of the operating theatres.

For transportation of the medical supply units, currently, the medical supply units are packed in two methods, namely the integrated package of the connecting arm and the pipe mobile housing and the separate package of the connecting arm and the pipe mobile housing. According to the method of the integrated package, the connecting arms of the medical supply units differ in lengths but all the connecting arms are long in length and basically over 1000 mm, so the large cartons are needed for packing, and after packing up, the package still has lots of space inside which results in that the package occupies a large space but a lot of inside space are not fully utilized. According to the method of the separate package, when packaging the medical supply units, a packing carton is designed dedicatedly for this medical supply unit, which results in a high cost and also causes the inconvenience in transportation. Particularly, the handles of the medical supply units cannot be folded in most circumstances, so the above two methods of packages cannot be pre-packed in modules, which also increases the operation and difficulties in the subsequent installation processes.

In the installation process of the medical supply units before use, the gas pipes and the electric protection pipes need to be laid in the arm and the mobile housing, however, in the installation of the medical supply units, the mobile housing and the arm are close-ended, which costs a long time for inserting the pipes during the laying and installation of the pipes, and also may damage the gas pipe and the electric protection pipe in the process of inserting the pipes, especially when the pipes are numerous, there is a potential possibility that the pipes cannot reach the designated location which eventually results in that the medical supply units cannot function. The medical supply units are also required to accommodate a certain amount of medical gas pipes and cables, the laying of the retractable elements in the medical supply units occupy most of the space of the passage, and the elbow part is narrow in width, which cannot meet the client's demand for capacity and may cause the rough installation which may damage the equipment and sequentially cause the function failure of the equipment.

The above problems and issues shall be taken into consideration and need to be solved in the design and the using processes of the medical supply units.

SUMMARY OF THE INVENTION

An objective of the present invention is to provide freely stopping medical supply units, which can solve the problems that the medical supply units cannot give a reliable positioning when stops in the course of operating, the medical supply units are difficult to pack for transportation, the inside space of the medical supply units is narrow which causes troubles in laying or even obstruct the laying of the gas pipes and electric protection pipes, and the medical supply units during the use have the lust-free, cleaning and hygiene issues.

The technical solution of the present invention is described as follows.

The freely stopping medical supply units include a mobile housing, a manual control mechanism for controlling location-movement or location-locking of the mobile housing, a horizontal arm, an elbow joint part for flexible connection of the horizontal arm and the vertical arm, a vertical arm, and a rotary shaft for flexible connection of the vertical arm, in which the rotary shaft connects flexibly to one end of the elbow joint part via the vertical arm, the other end of the elbow joint part connects flexibly to the mobile housing via the horizontal arm, and the end parts of the mobile housing are arranged with the manual control mechanism.

Preferably, the manual control mechanism includes a displacement component for controlling the location-movement of the mobile housing and a reset component for controlling the reset of the handle and the location-locking of the mobile housing; the displacement component includes a handle, a brake cable bar, and a brake cable, in which the handle is arranged with an engagement block for propelling rotation of a rotary shaft, the rotary shaft is arranged with an engagement groove for accommodating the engagement block, one end of the brake cable bar is connected to the rotary shaft, and the other end of the brake cable bar flexibly connects to the brake cable.

Preferably, the reset component includes reset tension springs, levers, and a first fixing board; the levers are circumferentially sleeved on a rotary shaft of the displacement component, the levers connect to a first fixing board via the reset tension springs, the first fixing board is arranged with a round hole through which the brake cable passes, the first fixing board is vertically fixed on a second fixing board, and the second fixing board is arranged with a via through which the brake cable bar passes.

Preferably, the mobile housing includes a mobile housing frame, an upper cover plate, a lower cover plate, a gas panel, a power panel, a terminal board and a second adapting flange; the upper cover plate is arranged at the top of the mobile housing frame, the lower cover plate is arranged at the bottom of the mobile housing frame, the gas panel and the power panel are respectively arranged on two sides of the mobile housing frame, the terminal board and the second adapting flange are respectively arranged on two ends of the mobile housing frame, a sealing tape is applied at the junction of the gas panel and the mobile housing frame and the junction of the power panel and the mobile housing frame, the power panel is arranged with a couple of slots, and the lower cover plate is arranged with an LED light and an air vent.

Preferably, the slot includes a strong electricity slot and a weak electricity slot, and the terminal board is provided with a silicone sheath.

Preferably, the elbow joint part includes an elbow housing, a retractable element, side connecting boards, and a lower connecting board; the retractable element, the side connecting boards and the lower connecting board are all arranged in the elbow housing, two sides of the lower connecting board respectively connect to the side connecting boards, a top end of the retractable element connects to the lower connecting board, a bottom end of the retractable element connects to the side connecting boards via a connector shaft, the bottom end of the retractable element connects to the horizontal arm via a force-arm regulating component, and the retractable element connects to the brake cable of the manual control mechanism. Here, the retractable element is preferably a gas spring, the elbow housing is made of plastic or silicone, and the structure of the elbow housing is preferably composed of a plastic middle section connecting to silicone at two ends. Under this structure of the elbow housing, the silicone at two ends ensures the elbow housing to be firmly circumferentially sleeved on side connecting boards, and the middle section made of the plastic may wrap the elbow housing and is durable and easy to clean. The elbow housing ensures the outer surface of the elbow joint part is smooth and easy to clean, which optimally prevents the accumulation of dusts and guarantees the hygiene in the using environment.

Preferably, the force-arm regulating component includes a force-arm regulating board, an upper platen, and a lower pad; the upper platen, the force-arm regulating board, the horizontal arm and the lower pad are sequentially arranged and fixed by bolts, the force-arm regulating board is arranged with an oblong hole for force-arm regulation, the bolts penetrate through the oblong hole, and the bolts are provided with protective caps.

Preferably, the bottom of the elbow joint part is arranged with a first adapting flange, a first rotary shaft penetrates through the first adapting flange and the side connecting boards, two ends of the first adapting flange are both arranged with a corner limit column, and the corner limit column is retained in the limiting hole.

Preferably, the end parts of the elbow joint part are arranged with lower connecting board, the end parts of the vertical arm are arranged with the upper connecting board, and the upper connecting board and the lower connecting board are rotatably connected by the second rotary shaft.

Preferably, the horizontal arm is arranged with an arm cover I, the vertical arm is arranged with an arm cover II, and the horizontal arm, the elbow joint part and the vertical arm are all arranged with internal cavities through which gas pipes or cables pass.

To realize the freely stopping and locking of the freely stopping medical supply units, the detailed operation of the manual control mechanism includes the following processes.

Release process: when manually pulling down the handle, the handle overcomes the tensile force of the reset tension springs and starts rotating downwardly, the handle connects to the engagement block, the rotary shaft is arranged with the engagement groove, and the engagement block is engaged into the engagement groove, and then the handle rotates downwardly to drive the rotary shaft to rotate via the engagement block, and in the meantime, the brake cable bar rotates, thus stretching the brake cable to make the locking switch of the retractable element gradually approach a critical point of the travel. When the brake cable bar eventually touches the other side of the limiting hole, the locking switch enters the open status, and the release process is finished.

Automatic reset and locking process: after the handle is released, the handle resets under the action of the tensile force of the reset tension spring, and in the meantime, the brake cable under the action of the tensile force of the spring inside the release mechanism of the retractable element rapidly passes the critical point of the travel and completes the locking function.

The above-mentioned release process and automatic reset and locking process realize the location-movement and the free stopping and locking of the mobile housing during use, thereby ensuring that the location of the freely stopping medical supply units is stable during use and effectively preventing waggling and other effects arising from the surroundings, and being easier to use.

For packing the freely stopping medical supply units, after rotating the vertical arm downwardly about the second rotary shaft for a certain angle to form an acute angle between the horizontal arm and the vertical arm, the medical supply units are ready for packing. In installation, after the pipes are inserted into the vertical arm, the pipes pass the elbow joint part and the horizontal arm and reach the mobile housing, then the vertical arm rotates upwardly about the second rotary shaft for 90°, the securing screws inside the lower connecting board are screwed and fixed in the threaded hole in the upper connecting board, the installation of the medical supply units is completed and the medical supply units are ready to use. The freely stopping medical supply units are ready for packing just by folding the vertical arm and the horizontal arm, which greatly reduces the height of the package of the medical supply units, and is convenient to transport and greatly reduces the cost of package.

During the laying of the pipes, after inserted into the rotary shaft, the pipes pass the vertical arm, the elbow joint part, the horizontal arm and reach the mobile housing, and then the pipes are inserted into the gas panel and fixed there. Then, the arm cover II is covered on the notch of the vertical arm, and the arm cover I is covered on the notch of the horizontal arm. The gas panel is inserted into the opening of the mobile housing, thus providing protection to the pipes in the horizontal arm, the vertical arm and the mobile housing. The entire laying of the pipes of the medical supply units are convenient and provides a reliable protection of the pipelines.

In view of the above, the present invention has the following effects. The freely stopping medical supply units of the present invention realize the location-movement and the free stopping and locking of the mobile housing during use by way of the manual control mechanism performing a release process and an automatic reset and locking process, thereby ensuring that the location of the freely stopping medical supply units is stable during use, effectively preventing waggling and other effects arising from the surroundings, and being easier to use. The manual control mechanism can drive the brake cable to stretch and retract, so as to remote-control the release and lock of the retractable element, and the functions of folding and control release may be realized at the same time just by carrying out a comfortable action, the newly incorporated folding function effectively increases the space above the head of the medical staff, thus avoiding the hazards of bumping incidents. This structure realizes the modulated pre-assembly which is then fixed at a certain location by bolts, thus saving the installation time as compared with the conventional structures, and this structure incorporates the factor of ergonomics and thus is comfortable in manipulating, also has an integral chic appearance. This freely stopping medical supply units are featured in the reasonable structure, convenient operation, easier to use, greatly reduced package cost, reliable protection of the overall pipelines of the medical supply units, light mobile housing weight, and easy to clean. The freely stopping medical supply units also have the advantages of providing the convenience in transportation, a low package cost, featured in the foldable handle, preventing the accumulation of dusts, optimizing the internal structure of the elbow parts structure, and increasing the number of the pipes of the products.

BRIEF DESCRIPTION OF THE DRAWINGS

FIG. 5 is a schematic structural view illustrating a manual control mechanism of the present invention;

FIG. 6 is a schematic structural view illustrating another structure of the manual control mechanism of the present invention;

FIG. 7 is a schematic structural view illustrating a rotary shall and an engagement groove according to an embodiment of the present invention;

LIST OF SOME OF THE REFERENCE NUMERALS

1—manual control mechanism, 2—mobile housing, 3—horizontal arm, 4—elbow joint part, 5—vertical arm, 6—rotary shaft, 7—upper connecting board, 8—second rotary shaft, 9—arm cover I, 10—arm cover II, 13 elbow housing, 21—beam(s), 23 round hole; 101—handle, 102—brake cable bar, 103—brake cable, 104—engagement block, 105—handle rotary shaft, 106—engagement groove. 107—reset tension springs, 108—levers, 109—first fixing board, 110—second fixing board; 201—mobile housing frame, 202—upper cover plate, 203—lower cover plate, 204—gas panel, 205—power panel, 206—terminal board, 207—second adapting flange. 208—sealing tape, 209—LED light, 210—air vent, 211—strong electricity slot, 212—weak electricity slot, 213—silicone sheath; 401—retractable element, 402—side connecting boards, 403—lower connecting board, 404—force-arm regulating board, 405—upper platen, 406—lower pad, 407—protective cap, 408—first adapting flange. 409—first rotary shaft, 410—corner limit column, 411—limiting hole, 500—gas spring upper shaft, 502—gas spring lower shaft, 510—direction, 512—steel string, 514—trigger member. 516—distance, 518—distance, 522—distance.

Detailed Description of a Preferred Embodiment

A preferred embodiment of the invention is described in detail below by reference to the accompanying drawing.

Figure 1:
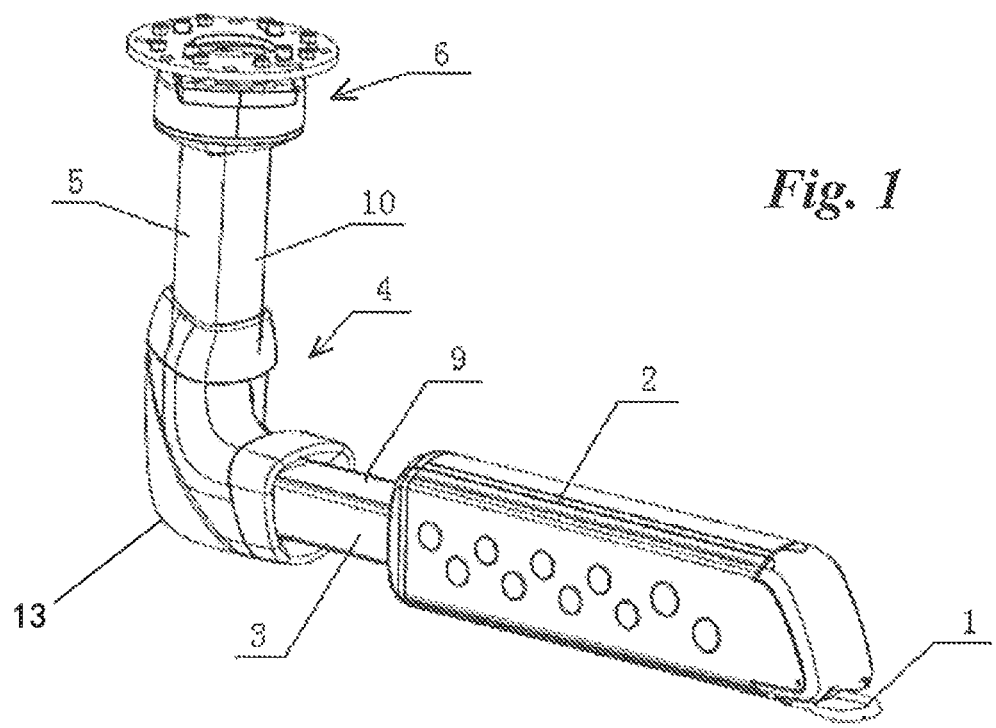
FIG. 1 is a schematic structural view illustrating an embodiment of the present invention.
Figure 2:
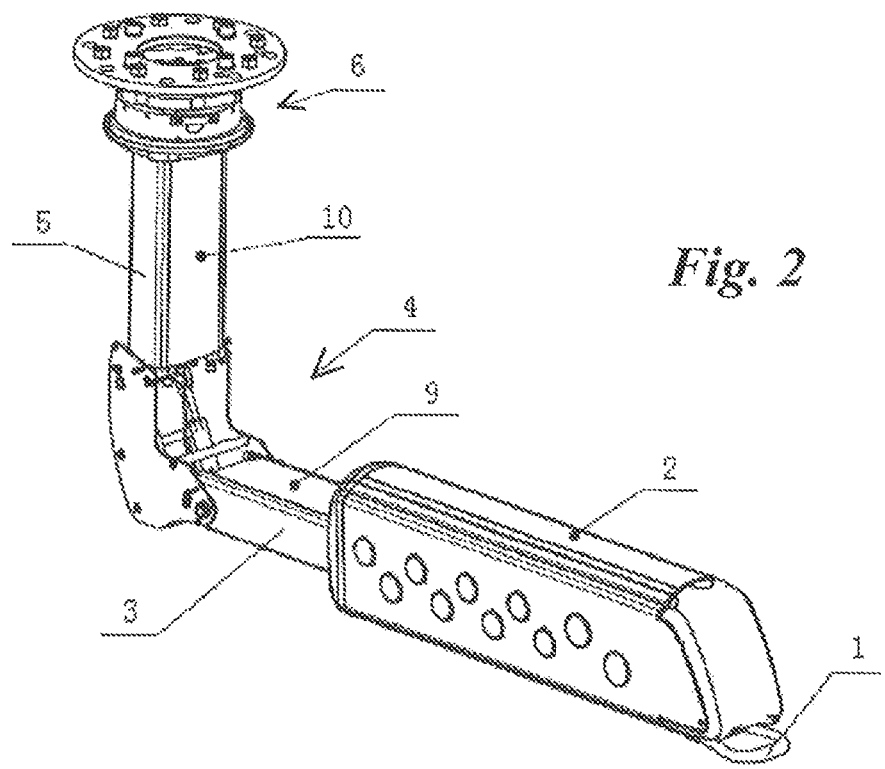
FIG. 2 is a schematic structural view illustrating an elbow joint part with the elbow housing removed according to an embodiment of the present invention.
Figure 4:
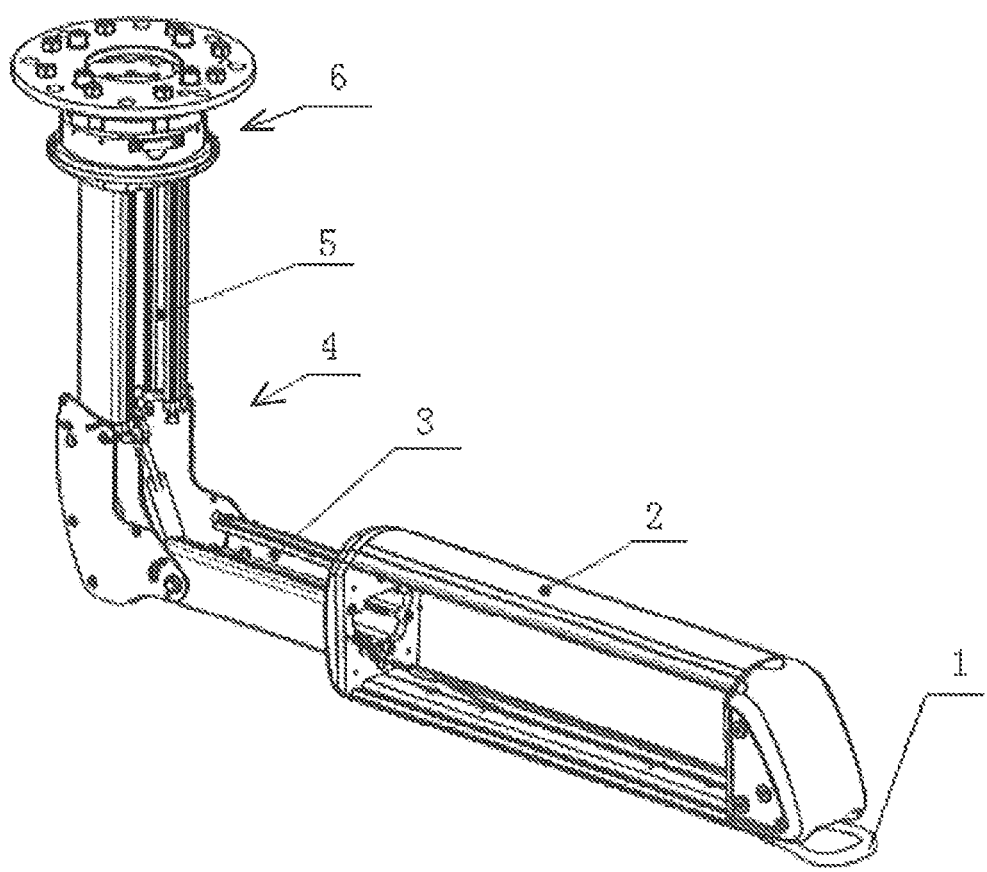
FIG. 4 is a schematic structural view illustrating the embodiments of the present invention before the pipes are laid.

In FIGS. 1, 2 and 4, the freely stopping medical supply units of the present invention include a mobile housing 2, a manual control mechanism 1 for controlling the location-movement or location-locking of the mobile housing 2, a horizontal arm 3, an elbow joint part 4 for flexible connection of the horizontal arm 3 and the vertical arm 5, a vertical arm 5, and a rotary shaft 6 for flexible connection of the vertical arm 5. The rotary shaft 6 connects flexibly to one end of the elbow joint part 4 via the vertical arm 5, the other end of the elbow joint part 4 connects flexibly to the mobile housing 2 via the horizontal arm 3, and the end parts of the mobile housing 2 are arranged with the manual control mechanism 1.

Figure 8:
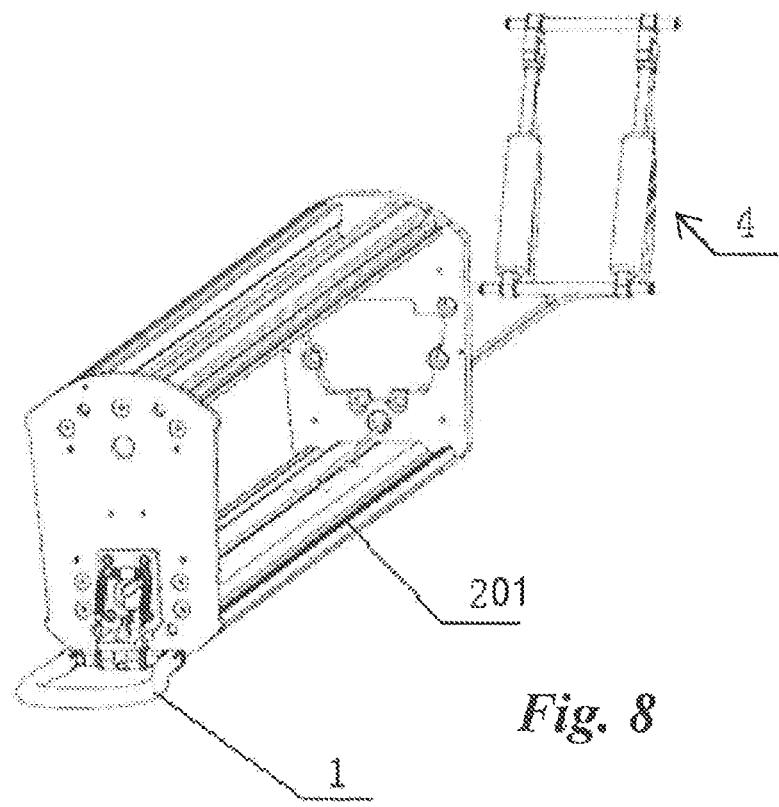
FIG. 8 is a schematic structural view illustrating the manual control mechanism, a mobile housing, and an elbow joint part of the present invention.

In FIGS. 5, 6 and 8, the manual control mechanism 1 includes a displacement component for controlling the location-movement of the mobile housing 2 and a reset component for controlling the reset of the handle 101 and the location-locking of the mobile housing 2. The displacement component includes a handle 101, a brake cable bar 102, a brake cable 103, in which the handle 101 is arranged with an engagement block 104 for propelling rotation of a handle rotary shaft 105, as shown in FIG. 7, the handle rotary shaft 105 is arranged with an engagement groove 106 for accommodating the engagement block 104, one end of the brake cable bar 102 is connected to the handle rotary shaft 105, and the other end of the brake cable bar 102 flexibly connects to the brake cable 103. The reset component includes reset tension springs 107, levers 108, and a first fixing board 109, in which the levers 108 are circumferentially sleeved on a handle rotary shaft 105 of the displacement component, the levers 108 connect to a first fixing board 109 via the reset tension springs, the first fixing board 109 is arranged with a round hole 23 through which the brake cable 103 passes, the first fixing board 109 is vertically fixed on a second fixing board 110, and the second fixing board 1 is arranged with a brake cable bar hole 140 through which the brake cable bar 102 passes.

Figure 9:
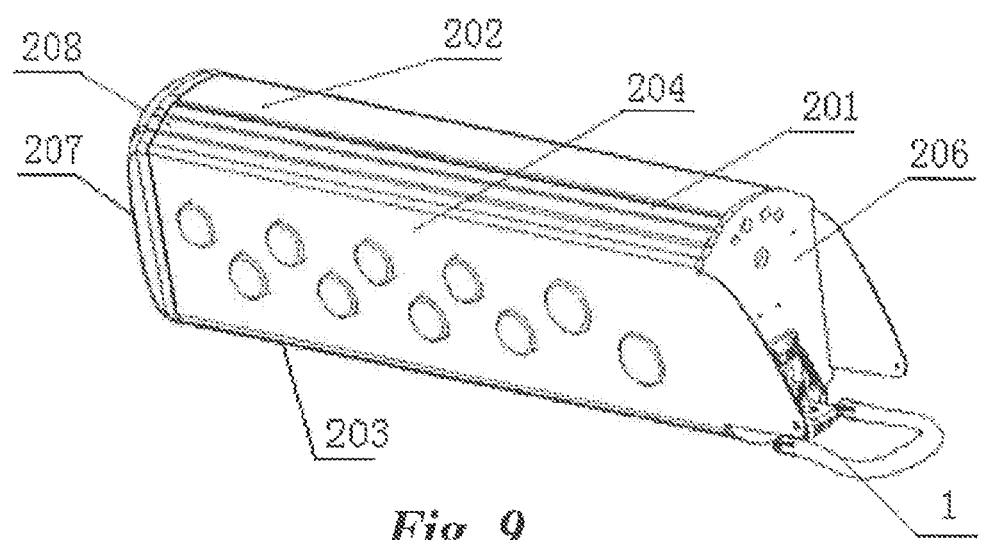
FIG. 9 is a schematic structural view illustrating the mobile housing of the present invention.
Figure 10:
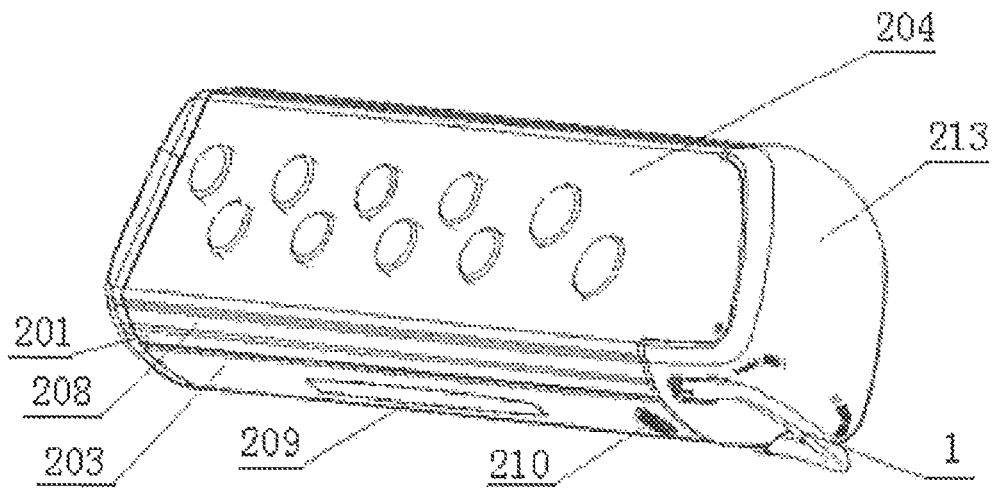
FIG. 10 is a schematic structural view illustrating another structure of the mobile housing of the present invention.
Figure 11:
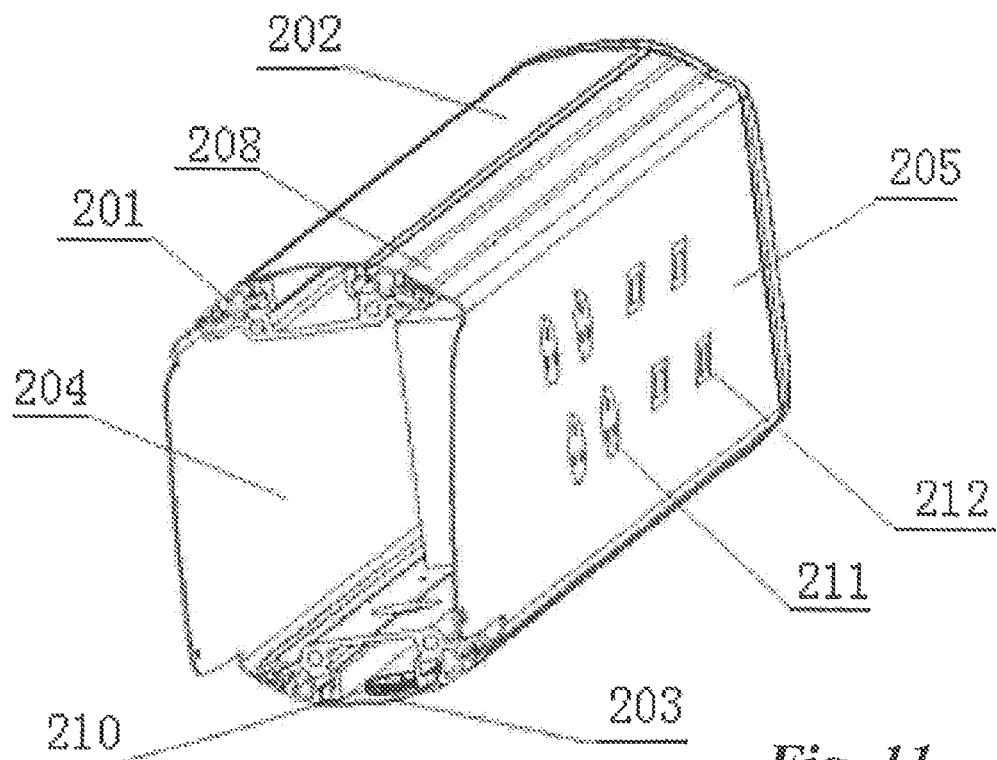
FIG. 11 is a schematic structural view illustrating the reversed structure of FIG. 8.

In FIGS. 9, 10 and 11, the mobile housing 2 includes a mobile housing frame 201, an upper cover plate 202, a lower cover plate 203, a gas panel 204, a power panel 205, a terminal board 206, and a second adapting flange 207. The upper cover plate 202 is arranged at the top of the mobile housing frame 201, and the lower cover plate 203 is arranged at the bottom of the mobile housing frame 201, the gas panel 204 and the power panel 205 are respectively arranged on two sides of the mobile housing frame 201, the terminal board 206 and the second adapting flange 207 are respectively arranged on two ends of the mobile housing frame 201, a sealing tape 208 is applied at the junction of the gas panel 204 and the mobile housing frame 201 and the junction of the power panel 205 and the mobile housing frame 201, the gas panel 204 is arranged with a couple of air vents, the power panel 205 is arranged with a couple of slots, and the lower cover plate 203 is arranged with an LED light 209 and an air vent 210. The slot includes a strong electricity slot 211 and a weak electricity slot 212, and the terminal board 206 is provided with a silicone sheath 213.

Figure 13:
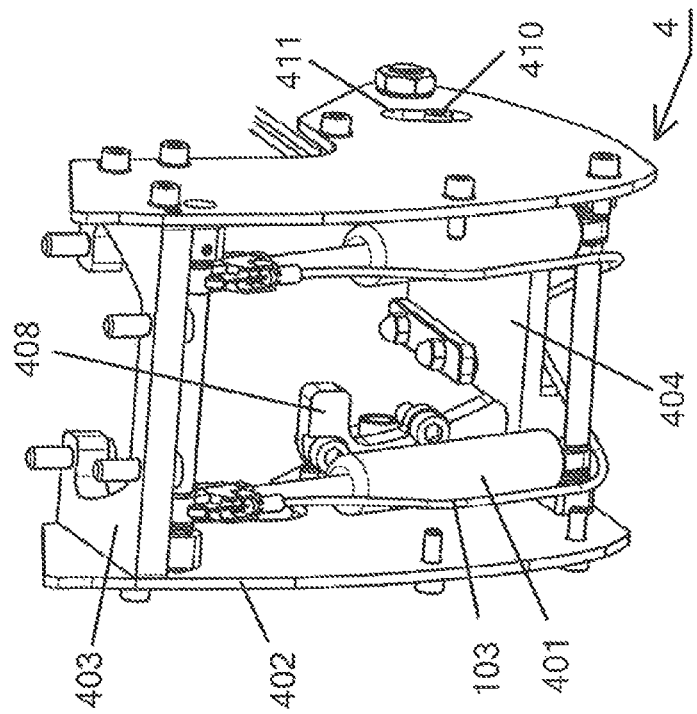
FIG. 13 is a schematic structural view illustrating another structure of the elbow joint part according to an embodiment of the present invention.
Figure 12:
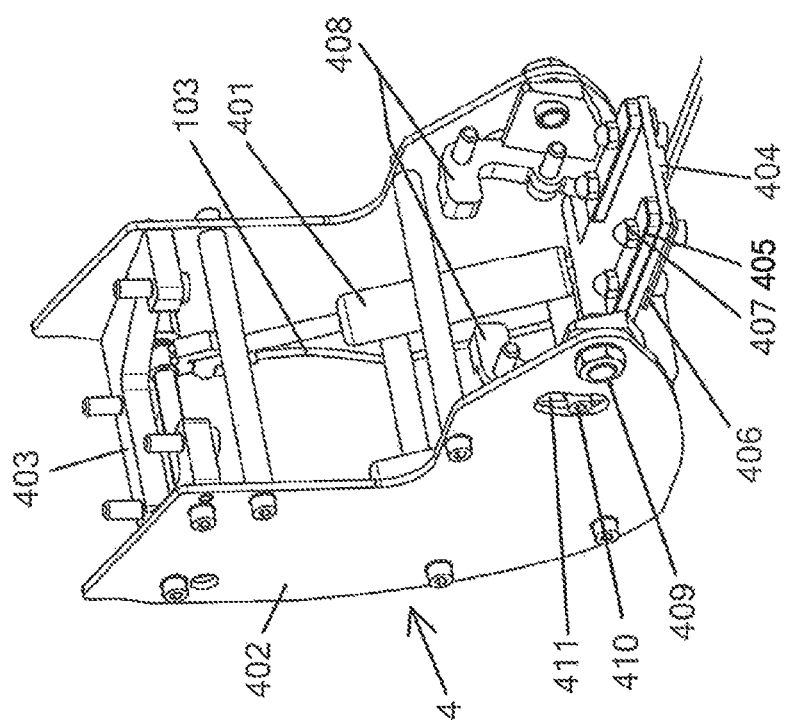
FIG. 12 is a schematic structural view illustrating the elbow joint part according to an embodiment of the present invention.
Figure 14:
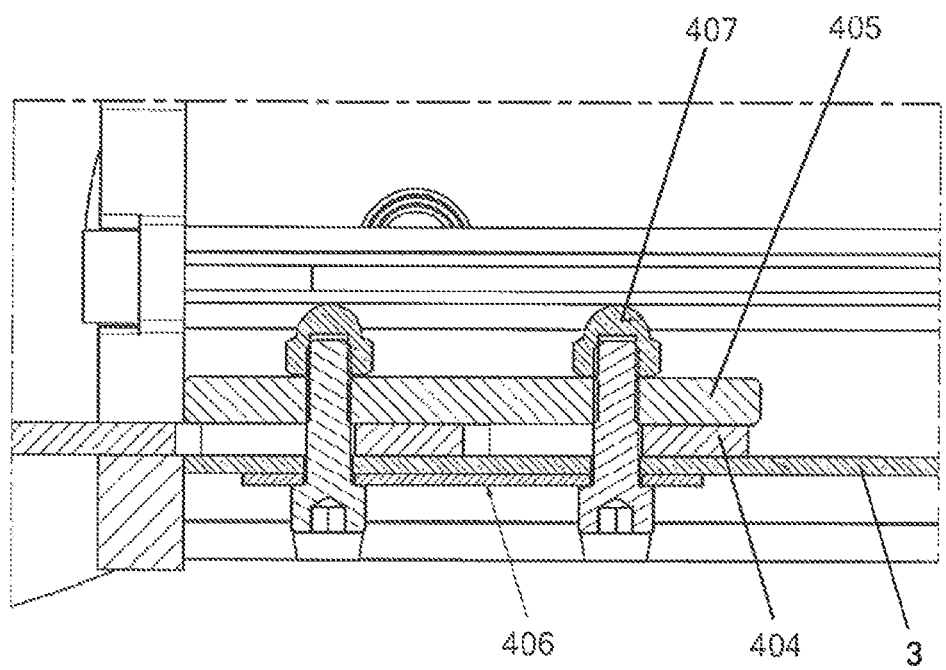
FIG. 14 is a schematic structural view illustrating a force-arm regulating component according to an embodiment of the present invention.
Figure 16:
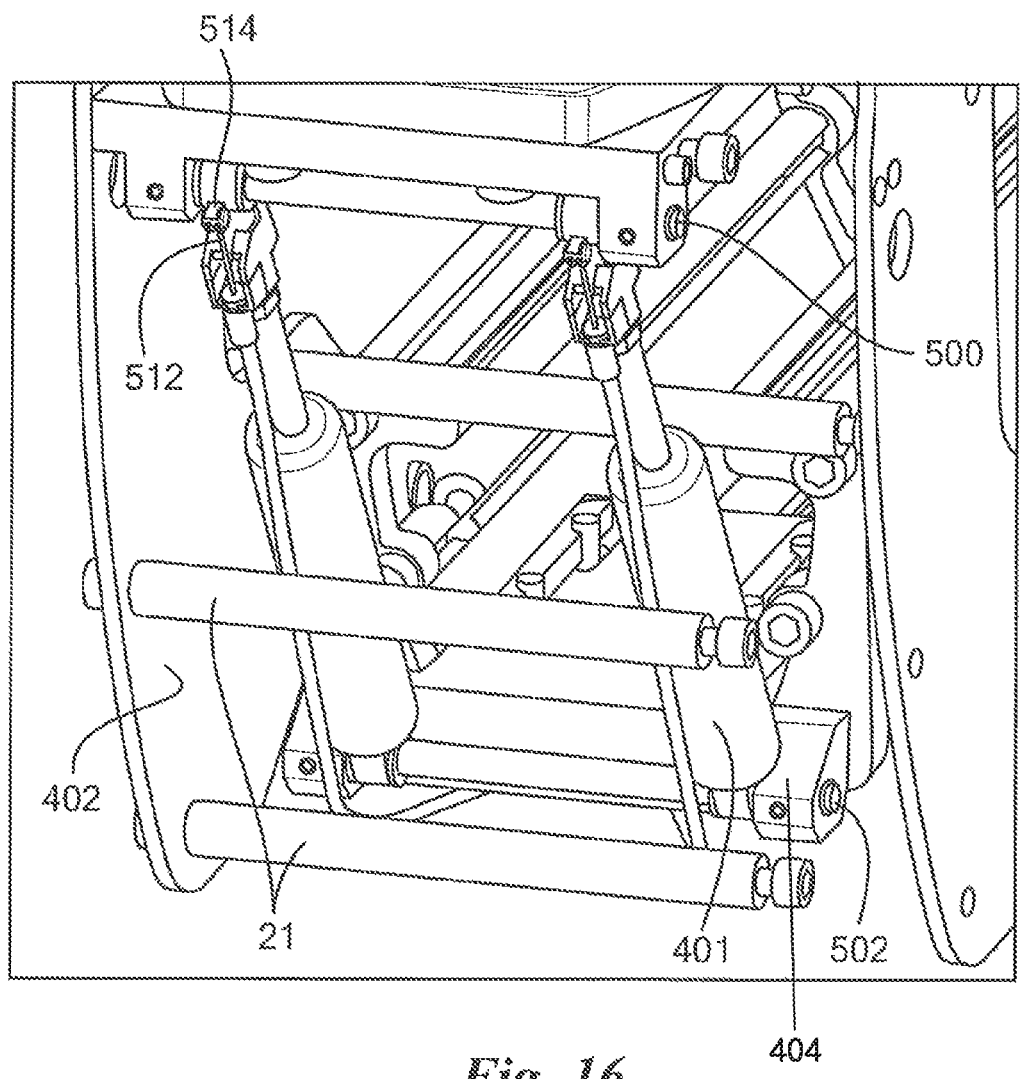
FIG. 16 is a schematic structural view illustrating the elbow joint part according to an embodiment of the present invention.
Figure 23:
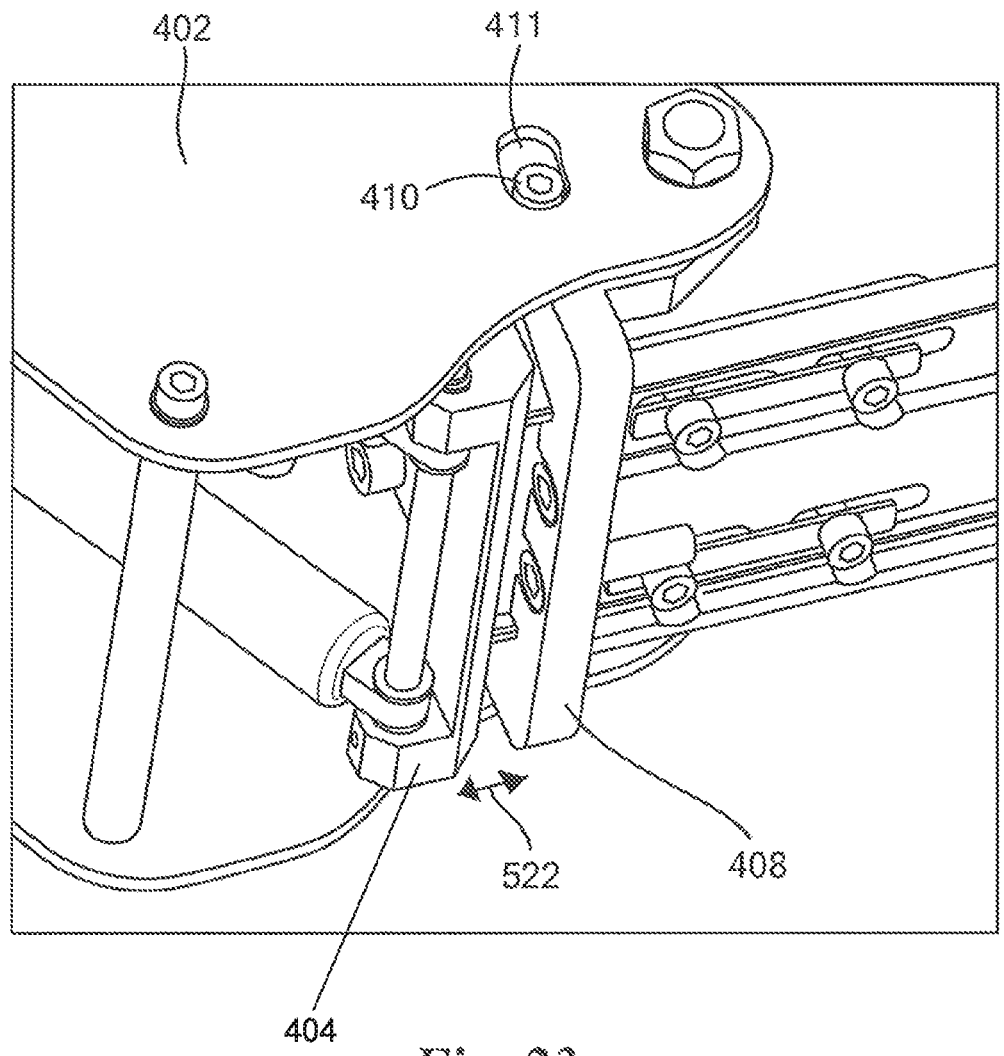
FIG. 23 is a schematic structural view illustrating an exemplary feature of the elbow joint part according to an embodiment of the present invention.

In FIGS. 12, 13 and 14, the elbow joint part 4 includes a retractable element 401, side connecting boards 402, and a lower connecting board 403. The retractable element 401, the side connecting boards 402 and the lower connecting board 403 are all arranged within the elbow housing 13 (see FIG. 1), two sides of the lower connecting board 403 respectively connect to the side connecting boards 402, a top end of the retractable element 401 connects to the lower connecting board 403, the bottom end of the retractable element 401 connects to the horizontal arm 3 via a force-arm regulating component as depicted in FIGS. 16 and 23, and the retractable element 401 connects to the brake cable 103 of the manual control mechanism 1. The retractable element 401 preferably is a gas spring, the force-arm regulating component includes a force-arm regulating board 404, an upper platen 405, and a lower pad 406. The upper platen 405, the force-arm regulating board 404, the horizontal arm 3 and the lower pad 406 are sequentially arranged and fixed by bolts, the force-arm regulating board 404 is arranged with an oblong hole for force-arm regulation, the bolts penetrate through the oblong hole, and the bolts are provided with protective caps 407. The bottom of the elbow joint part 4 is arranged with a first adapting flange 408, a first rotary shaft 409 penetrates through the first adapting flange 408 and the side connecting board 402, two ends of the first adapting flange 408 are both arranged with a corner limit column 410, and the corner limit column 410 is retained in a limiting hole 411. The end parts of the elbow joint part 4 are arranged with the lower connecting board 403, the end parts of the vertical arm 5 are arranged with the upper connecting board 7, and the upper connecting board and the lower connecting board 403 are rotatably connected by the second rotary shaft 8.

Figure 3:
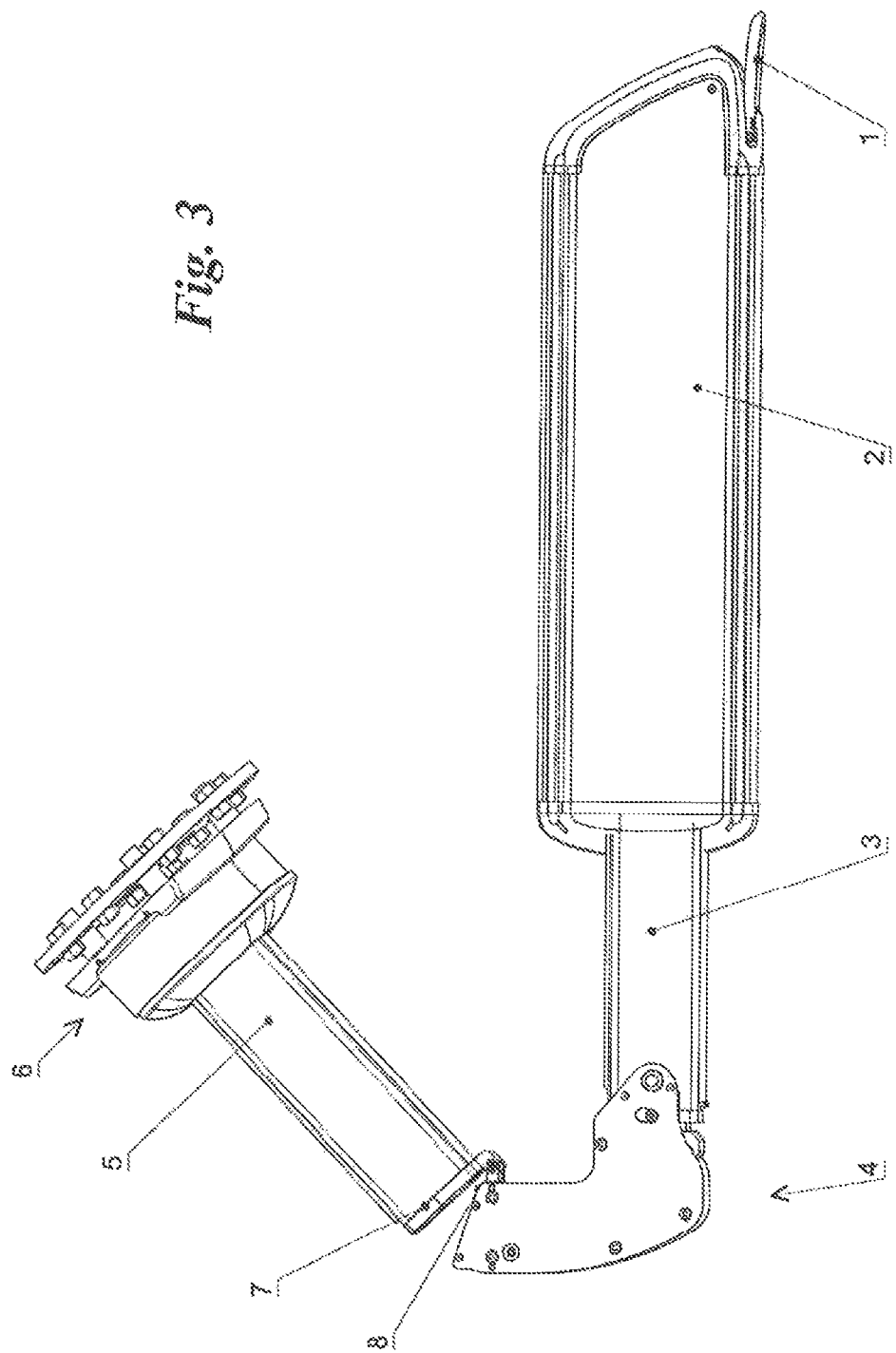
FIG. 3 is a schematic structural view illustrating an embodiment of present invention after being folded for packing.

In FIGS. 1 and 2, the horizontal arm 3 is arranged with an arm cover 9, the vertical arm 5 is arranged with an arm cover 10, and the horizontal arm 3 and the vertical arm 5 are set to be recessed shape. The horizontal arm 3, the elbow joint part 4 and the vertical arm 5 are all arranged with internal cavities through which gas pipes or cables pass. In FIG. 3, for packing the freely stopping medical supply units, only the vertical arm 5 rotates about the second rotary shaft 8 downwardly for a certain angle to form an acute angle between the horizontal arm 3 and the vertical arm 5, and then the medical supply units are ready for packing.

In the freely stopping medical supply units, the rotary shaft 6 can be securely connected to the ceiling or other fixed member at the top. The side connecting boards 402 is fixed by beams 21, The first rotary shaft 409 is attached to an adapting flange 408 (shown in FIG. 15) and fixed to the side connecting boards 402, such as by the use of fixing nuts and copper bushings, and fastening screws and position regulation washers placed between the side connecting boards 402 and the adapting flange 408.

To realize the freely stopping and locking of the freely stopping medical supply units the detailed operation of the manual control mechanism includes the following processes.

Release process: when manually pulling down the handle 101, the handle 101 overcomes the tensile force of the reset tension springs and starts rotating downwardly, the handle 101 connects to the engagement block 104, the handle rotary shaft 105 is arranged with the engagement groove 106, and the engagement block 104 is engaged into the engagement groove 106, and then the handle rotates downwardly to drive the handle rotary shaft 105 to rotate via the engagement block 104, and in the meantime, the brake cable bar 102 rotates, thus stretching the brake cable 103 to make the locking switch of the retractable element 401 gradually approach a critical point of the travel. When the brake cable bar 102 eventually touches the other side of the brake cable bar hole 140 the locking switch enters the open status, and the release process is finished.

Automatic reset and locking process: in the handle 101, the rotation of the engagement block 104 drives the rotation of the rotary shaft 105, and further the levers 108 pull the reset tension springs, the brake cable bar 102 is driven by the rotary shaft 105 to rotate at the same time, thus realizing simultaneous motion of the reset spring 107 and the brake cable bar 102, which forms the elasticity in the reset process of the manual control mechanism 1. After the handle 101 is released, the handle 101 starts to reset under the action of the tensile force of the reset spring 107, and in the meantime, the brake cable 103 under the action of the tensile force of the spring inside the release mechanism of the retractable element 401 rapidly passes the critical point of the travel and completes the locking function. Depending on the intensity of the tensile force, the number or location of the reset tension springs may be adjusted. The size of the limiting hole 411 needs to be adjusted according to the release travel of the retractable element 401. The second fixing board 110 may change structure design according to the actual installation requirements.

The above-mentioned release process and automatic reset and locking process realize the location-movement and the free stopping and locking of the mobile housing 2 during use, thereby ensuring that the location of the freely stopping medical supply units is stable during use and effectively preventing waggling and other effects arising from the surroundings, and being easier to use.

In the manual control mechanism 1 of this embodiment, the stretch and retract actions of the brake cable 103 remote-control the release and lock of the retractable element 401, and the functions of folding and control release may be realized at the same time just by one action, the newly incorporated folding function effectively increases the space above the head of the medical staff, thus avoiding the hazards of bumping incidents. This structure realizes the modulated pre-assembly which is then fixed at a certain location by bolts, thus saving the installation time as compared with the conventional structures, and this structure incorporates the factor of ergonomics and thus is comfortable in manipulating, also has an integral chic appearance.

In the mobile housing 2 of this embodiment, after the laying of the pipes, the terminal board 206 and the manual control mechanism 1 are connected, a silicone protective cover and the upper cover plate 202 are put on, and the sealing tape 208 is inserted into the interface of the mobile housing frame 201 and the gas panel 204 and the power panel 205, and thus the entire outer surface of the mobile housing 2 is smooth, thereby avoiding the accumulation of dust and is easy to clean. The sheet material of the mobile housing 2 is aluminum, thus reducing the weight of the mobile housing 2. In the meantime, the lower cover plate 203 and the upper cover plate 202 reinforce the mobile housing frame 201, which prevents the potential fracture of the mobile housing 2 caused by the insufficient rigidity of the aluminum material. The LED light 209 is added on the lower cover plate 203, which provides short-distance illumination for doctors, and the air vent 210 in the lower cover plate 203 ensures the ventilation of the air inside the mobile housing 2 to the outside air flow. The number of the pipe insertion opening is one and maybe added according to the clients' demand, for the insertion of more gas supply pipes, which provides convenience during the surgical operations. The power panel is arranged with the strong electricity slot 211 and the weak electricity slot 212. The number of the strong electricity slot 211 is at least one and may be added according to the clients' demand, for connecting multiple medical equipment and supplying power, and the connection is easy and convenient to practice. The number of the weak electricity slot 212 is at least one and may be added according to the clients' demand, for transmitting messages to multiple pieces of equipment.

In the elbow joint part 4 of this embodiment, the lower connecting board 403 provides basis and fixes the side connecting boards 402, and also supports the upper connector shaft of the retractable element 401. The shape of the cavity of the elbow joint part 4 matches the cavity of the vertical arm 5, which maximizes the cross-sectional area and prevents scratching the gas pipe or the cable. The side connecting boards 402 includes the left and right parts which are reinforced by the beam, so as to provide a cavity in the elbow joint part 4 and reduce the weight of the structure. The limiting hole 411 in the side connecting boards 402 works together with the corner limit column 410 to prevent the over operations and damages to the products and guarantee the safety of the user. The arrangement of the retractable element 401 at the extreme locations on two sides aims to ensure the maximal capacity and convenience in installation. The lower ends of the side connecting boards 402 are securely connected with the first rotary shaft 409. The lower end of the retractable element 401 respectively connects to the force-arm regulating board 404, and the force-arm regulating board 404 connects to the horizontal arm 3. Since the horizontal arm 3 is extruded aluminum material and the wall of the horizontal arm 3 is thin, a lower pad 406 is added between the force-arm regulating board 404 and the aluminum material of the horizontal arm 3, thereby ensuring the stability of the structure. The force-arm regulating board 404 has a set of oblong holes in the middle, the upper platen 405 and the lower pad 406 clamp the force-arm regulating board 404 and the horizontal arm 3 in-between by the bolts, after the bolts are unscrewed, the location of the horizontal arm 3 may be extended and retracted along the oblong hole, thereby realizing the force-arm regulating function.

In the design of the force-arm regulating structure, in consideration of the over operation of the operator on the bolts, such as the excessive unscrewing of the bolts, the protective cap 407 is added, with the protective cap, when the travel of unscrewing the bolts reaches the gap between the protective cap 407 and the upper platen 405, the bolts cannot be further unscrewed. The path of the brake cable 103 in this structure can be controlled, the brake cable 103 may be fixed on the beam by binding strips or other fixing member, penetrate into the cavity of the horizontal arm 3 through the rectangular cavity under the force-arm regulating board 404, and continuously extend to the operating handle 101 along the bottom of the horizontal arm 3.

FIGS. 15 through 24 provide additional illustrations of the exemplary embodiments set forth above in order to further clarify the operation and features of the present disclosure.

Figure 15:
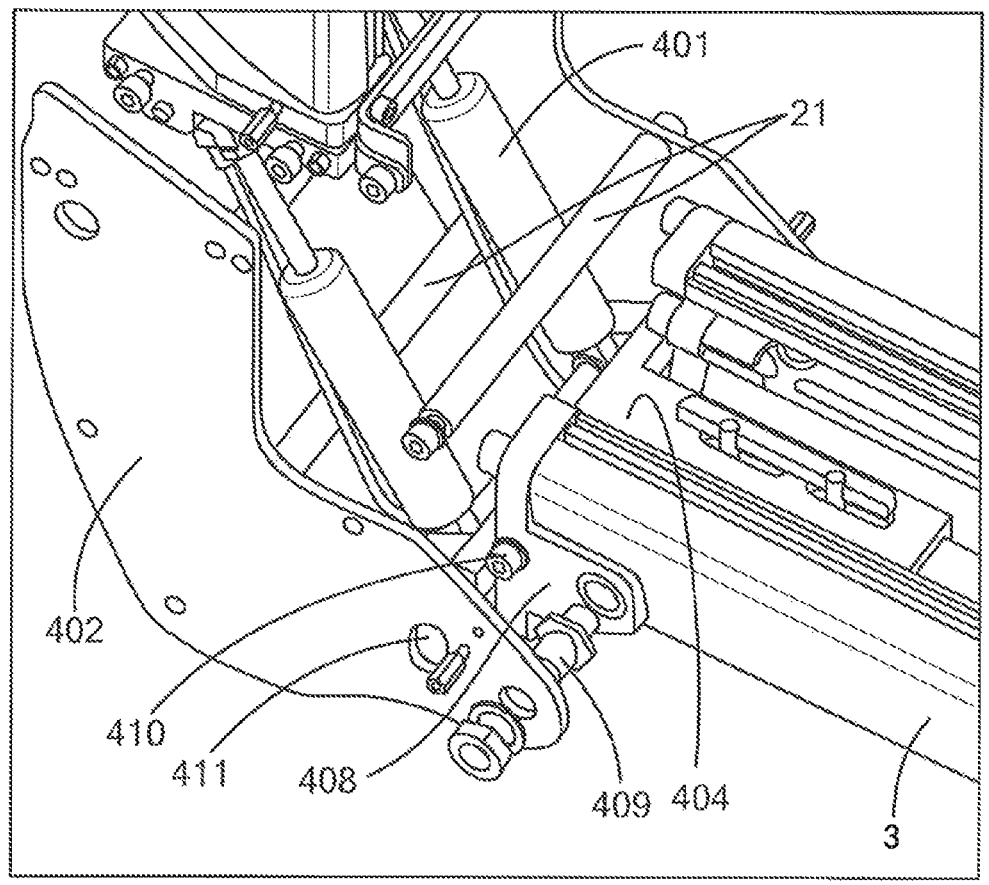
FIG. 15 is a schematic structural view illustrating the elbow joint part according to an embodiment of the present invention.

FIG. 15 clarifies an exemplary feature of the claimed invention in which farce-arm regulating board 404 may be positioned via apertures or holes. Horizontal arm 3 may be, for example, a housing or tub that connects the exemplary disclosed elbow joint part with other elements of the exemplary disclosed supply unit. Such a configuration may provide, for example, suitable balance to the disclosed system for use by operators. FIG. 15 also provides a detailed view of exemplary first rotary shaft 409.

Figure 17:
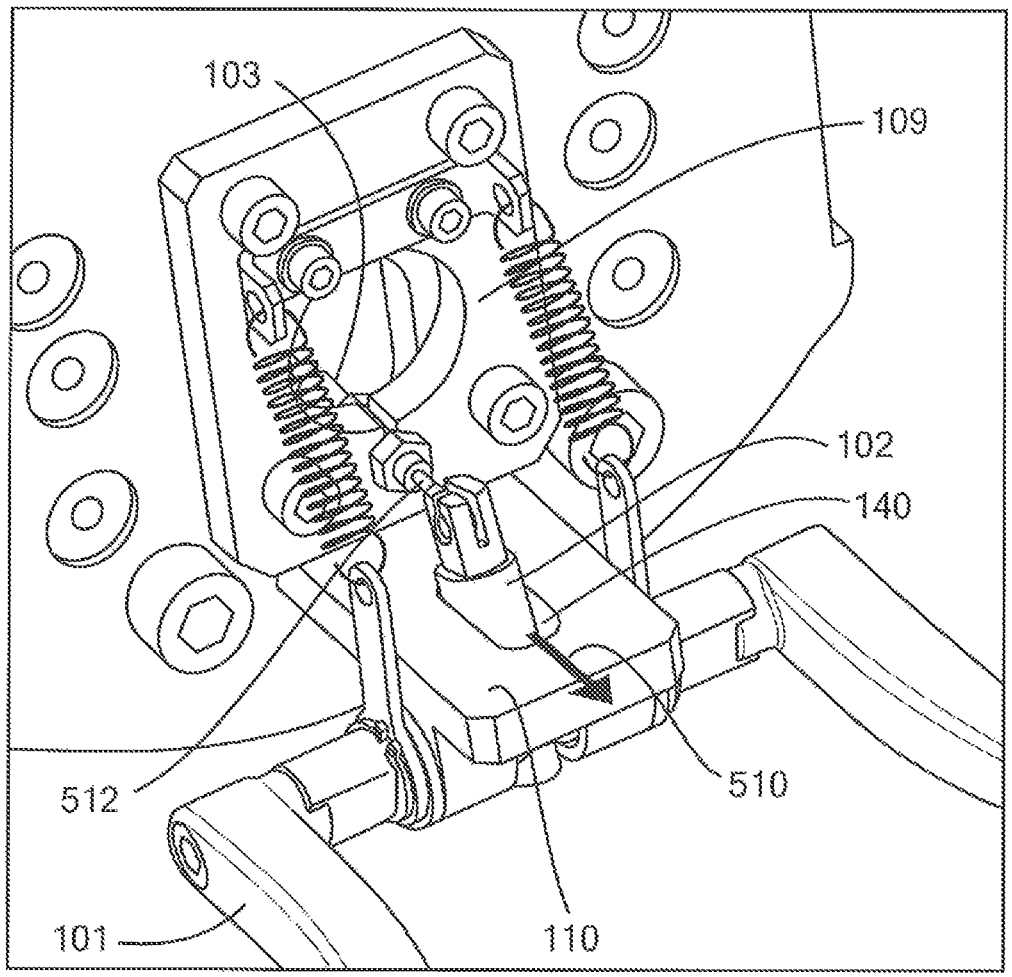
FIG. 17 is a schematic structural view illustrating a manual control mechanism of the present invention.
Figure 18:
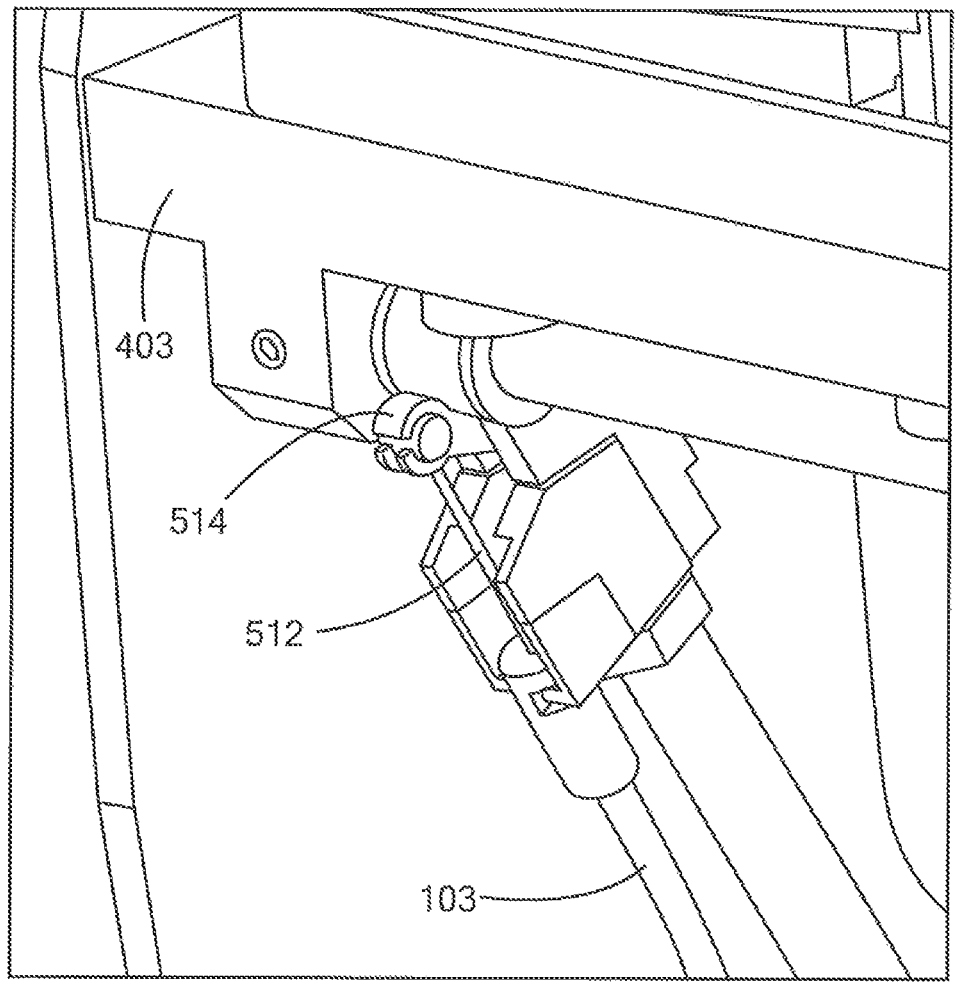
FIG. 18 is a schematic structural view illustrating an exemplary feature of the elbow joint part according to an embodiment of the present invention.

FIGS. 16-18 clarify an exemplary feature of the claimed invention. FIG. 16 illustrates an exemplary gas spring upper shaft 500 and an exemplary gas spring lower shaft 502. A trigger member 514 may be disposed on a head of a gas spring assembly, as illustrated in FIGS. 16 and 18. As illustrated in FIGS. 16, 17, and 18, when handle 101 is rotated (e.g., causing a movement of brake cable bar 102 in a direction 510 illustrated in FIG. 17), a tension member (e.g., a cable or string such as a steel string 512) disposed inside of brake cable 103 is pulled, which actuates trigger member 514, thereby unlocking the gas spring illustrated in FIGS. 16 and 18. Once unlocked, the exemplary disclosed supply unit may be repositioned by an operator. The locking method may be the reverse of the above-described unlocking method illustrated in FIGS. 16-18.

Figure 19:
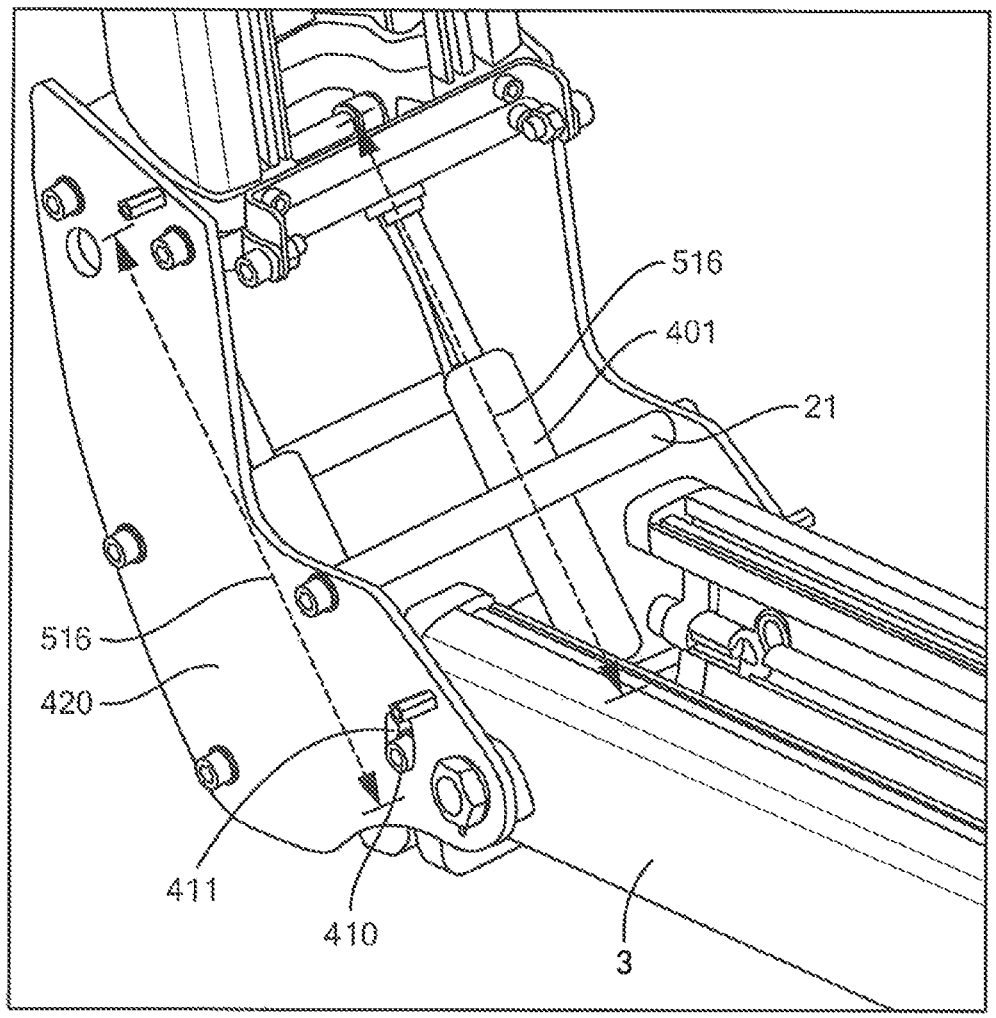
FIG. 19 is a schematic structural view illustrating the elbow joint part according to an embodiment of the present invention.
Figure 20:
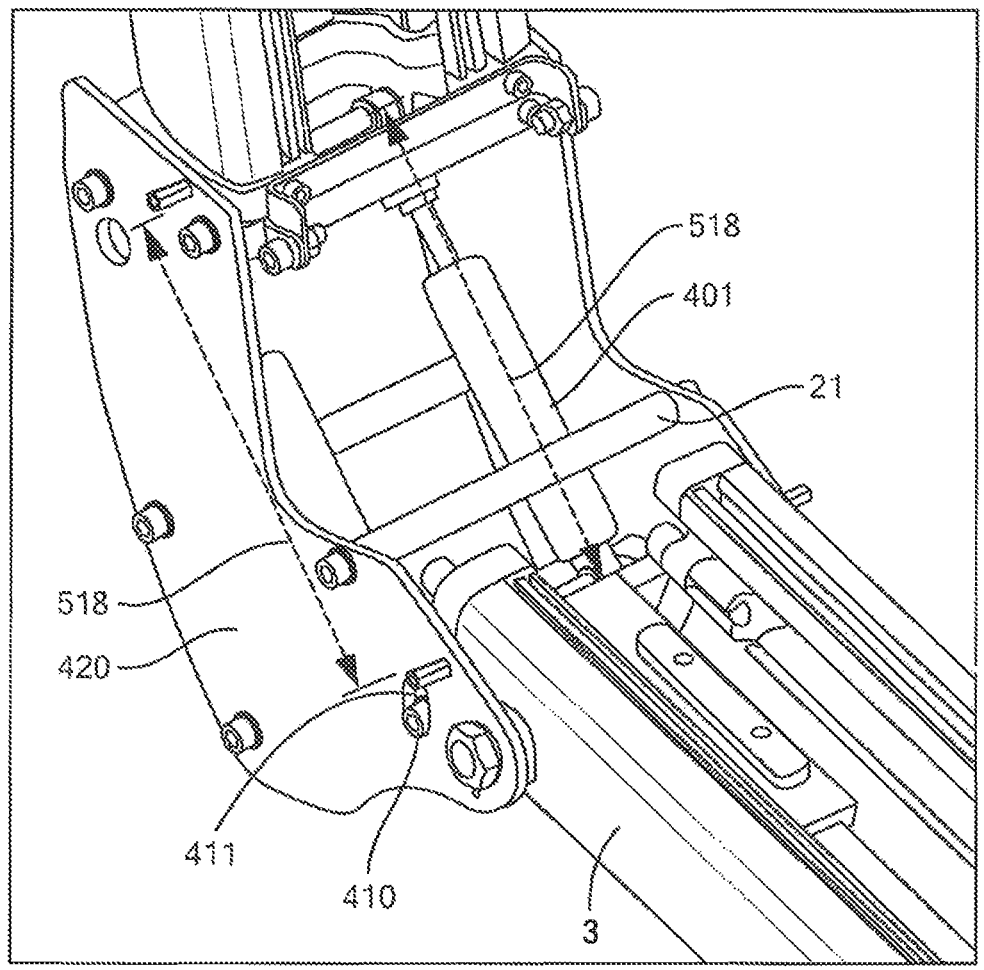
FIG. 20 is a schematic structural view illustrating the elbow joint part according to an embodiment of the present invention.

FIGS. 19 and 20 clarify an exemplary feature of the claimed invention. When trigger member 514 (e.g., which is linked to handle 101 as described above) is unlocked as illustrated in FIGS. 16-18, an operator may manipulate handle 101 to move the exemplary gas spring as desired (e.g., as illustrated by differing exemplary distances 516 and 518 illustrated in FIGS. 19 and 20, respectively).

Figure 21:
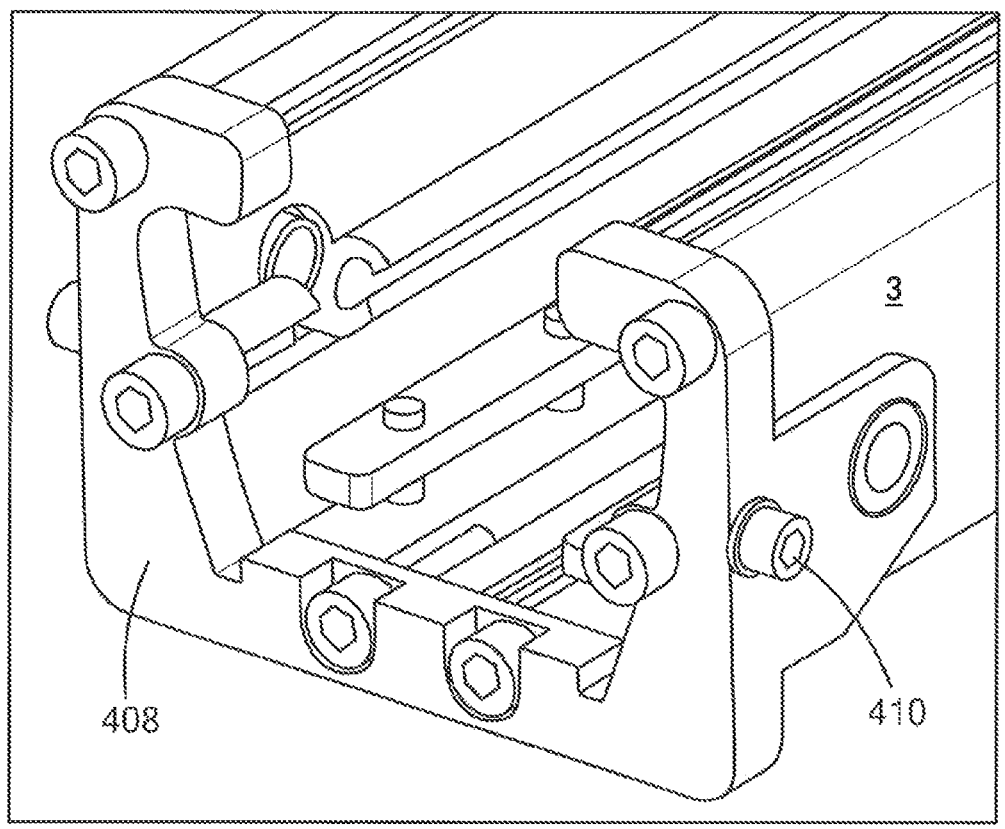
FIG. 21 is a schematic structural view illustrating an exemplary member that may connect to the elbow joint part according to an embodiment of the present invention.
Figure 22:
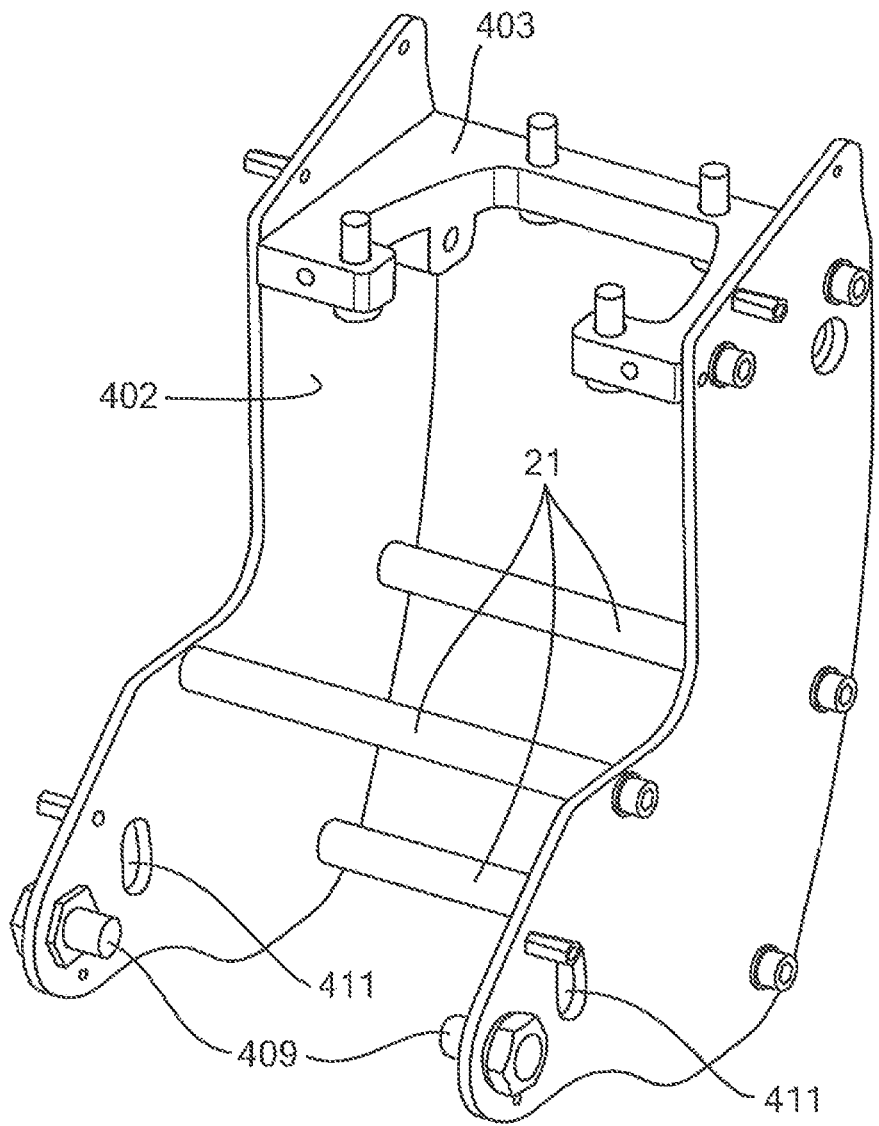
FIG. 22 is a schematic structural view illustrating the elbow joint part according to an embodiment of the present invention.

FIGS. 21, 22, and 23 clarify an exemplary feature of the claimed invention, FIGS. 21, 22, and 23 clarify further details of how first adapting flange 408 connects to horizontal arm 3 described above (e.g., apertures and fasteners disposed in side connecting boards 402 and further clarifying details of first adapting flange 408). Also, for example, FIG. 23 illustrates how force-arm regulating board 404 may be adjusted to change a distance 522 between force-arm regulating board 404 and first adapting flange 408 (e.g., to obtain a desired loading force of the exemplary disclosed supply unit).

Figure 24:
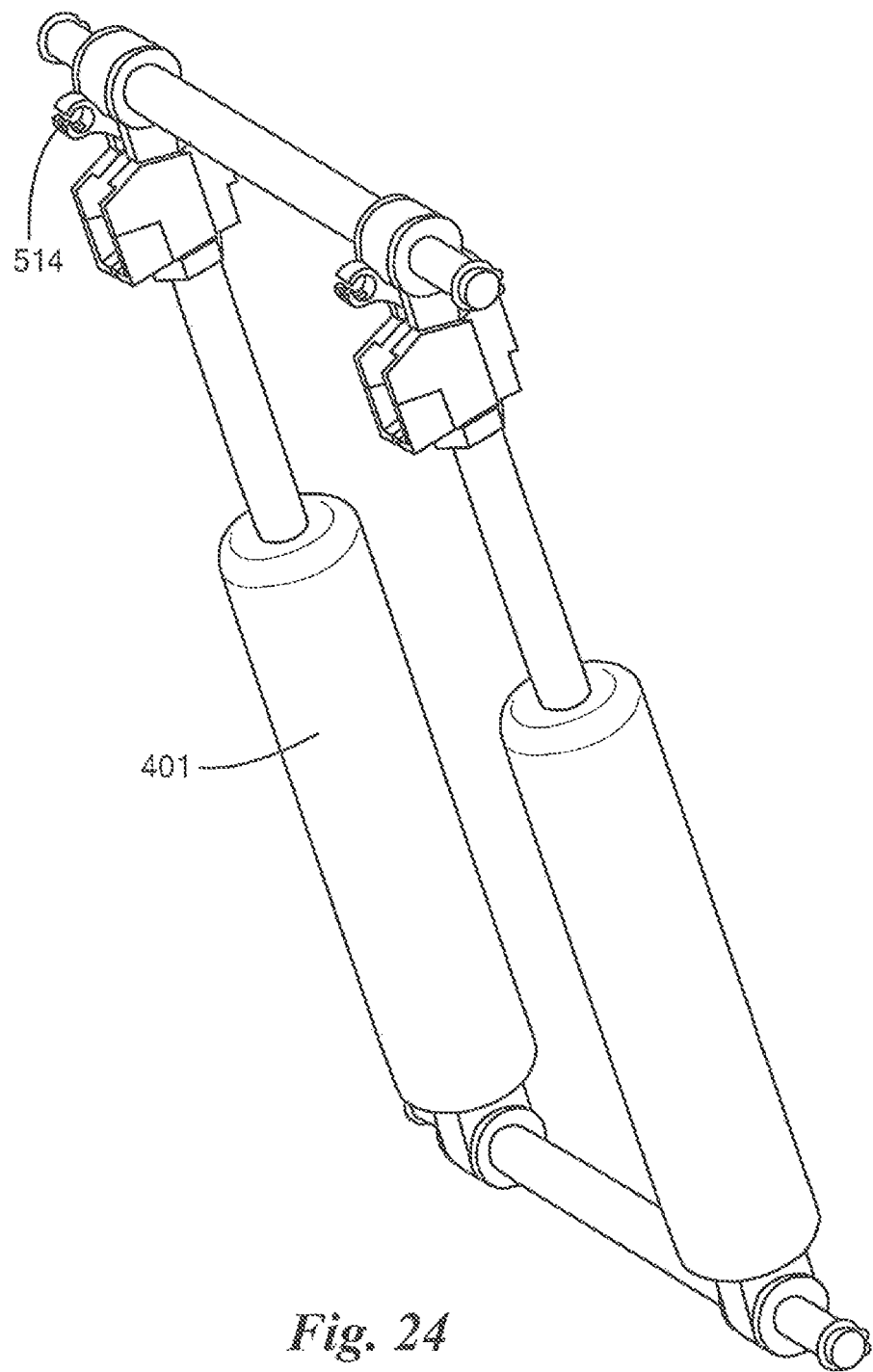
FIG. 24 is a schematic structural view illustrating an exemplary retractable element of the elbow joint part according to an embodiment of the present invention.

FIG. 24 also clarifies exemplary features of the claimed invention. For example, FIG. 24 provides a clarifying illustration of retractable elements 401.

While there has been shown several and alternate embodiments of the present invention, it is to be understood that certain changes can be made as would be known to one skilled in the art without departing from the underlying scope of the present invention as is discussed and set forth above and below including claims. Furthermore, the embodiments described above and claims set forth below are only intended to illustrate the principles of the present invention and are not intended to limit the scope of the present invention to the disclosed elements.

What is claimed is:

1. A medical supply unit, comprising:
a mobile housing;
a displacement component including a handle, a brake cable bar, and a brake cable for controlling location-movement and location-locking of the mobile housing;
a horizontal arm;
a vertical arm;
an elbow joint part that connects the horizontal arm and the vertical arm; and
a rotary shaft configured for movable connection of the vertical arm to a surface above the medical supply unit, in which the rotary shaft connects to one end of the elbow joint part via the vertical arm, another end of the elbow joint part connects to the mobile housing via the horizontal arm, and the mobile housing is attached to the displacement component; and
the handle including an engagement block that upon actuation of the handle propels rotation of a handle rotary shaft;
wherein the handle rotary shaft includes an engagement groove that accommodates the engagement block, with one end of the brake cable bar being connected to the handle rotary shaft to rotate therewith, and another end of the brake cable bar movably connected to the brake cable.

2. The medical supply unit of claim 1, further including a reset component for controlling the reset of the handle and the location-locking of the mobile housing; the reset component comprises reset tension springs, the reset tension springs being positioned to bias the displacement component towards a locked configuration.

3. The medical supply unit of claim 1, wherein:
the mobile housing comprises at least one of a gas panel configured for providing gas, and a power panel configured for providing electrical power.

4. The medical supply unit of claim 1, wherein the elbow joint part comprises an elbow housing, a retractable element, side connecting boards, and a lower connecting board;
wherein the retractable element, the side connecting boards and the lower connecting board are all arranged in the elbow housing, and two sides of the lower connecting board respectively connect to the side connecting boards,
wherein a top end of the retractable element connects to the lower connecting board, a bottom end of the retractable element connects to the horizontal arm via a force-arm regulating component, and the retractable element connects to the brake cable.

5. The medical supply unit of claim 1:
wherein the elbow joint part comprises a retractable element; and
the retractable element is operatively linked to the handle via the brake cable so that movement of the handle can unlock the retractable element.

6. The medical supply unit of claim 1, wherein the elbow joint part comprises side connecting boards, and an adapting flange attached to the side connecting boards.

7. The medical supply unit of claim 1, wherein the elbow joint part is attached to a lower connecting board, the vertical arm is attached to an upper connecting board, and the upper connecting board and the lower connecting board are rotatably connected.

8. The medical supply unit of claim 1:
wherein the elbow joint part comprises a gas spring;
the gas spring is operatively linked to the handle via the brake cable so that movement of the handle can unlock the gas spring; and
location-movement of the mobile housing by an operator in enabled when the gas spring is unlocked.

9. A medical supply unit, comprising:
a mobile housing;
a displacement component including a handle, a brake cable bar, and a brake cable for controlling location-movement and location-locking of the mobile housing;
a horizontal arm;
a vertical arm;
an elbow joint part that connects the horizontal arm and the vertical arm; and
a rotary shaft for movable connection of the vertical arm to a surface above the medical supply unit, in which the rotary shaft connects to one end of the elbow joint part via the vertical arm, another end of the elbow joint part connects to the mobile housing via the horizontal arm, and a first end of the mobile housing is attached to the displacement component;
a reset component for controlling the reset of the handle and the location-locking of the mobile housing;

the handle includes an engagement block for propelling rotation of a handle rotary shaft upon actuation of the handle; and wherein the handle rotary shaft comprises an engagement groove for accommodating the engagement block, one end of the brake cable bar being connected to the handle rotary shaft for rotation therewith, and another end of the brake cable bar movably connecting to the brake cable.

10. The medical supply unit of claim 9, wherein a first end of the elbow joint part is attached to a lower connecting board, a first end of the vertical arm is attached to an upper connecting board, and the upper connecting board and the lower connecting board are rotatably connected.

11. The medical supply unit of claim 9, wherein:

the reset component comprises reset tension springs, levers, and a first fixing board; and the levers connect to the first fixing board via the reset tension springs, the first fixing board is arranged with a round hole through which the brake cable passes, the first fixing board is vertically fixed on a second fixing board, and the second fixing board is arranged so that the brake cable bar passes through the second fixing board.

* * * * *